E. E. GAMON.
WATER METER.
APPLICATION FILED AUG. 12, 1909.

1,015,552.

Patented Jan. 23, 1912.

WITNESSES:
Lawrence Adriance
Clifford A. Alliston

INVENTOR
Ernest E. Gamon.
BY
Fredk C. Fischer,
ATTORNEY

UNITED STATES PATENT OFFICE.

ERNEST E. GAMON, OF NEWARK, NEW JERSEY.

WATER-METER.

1,015,552.          Specification of Letters Patent.          Patented Jan. 23, 1912.

Original application filed March 3, 1909, Serial No. 481,083. Divided and this application filed August 12, 1909. Serial No. 512,513.

*To all whom it may concern:*

Be it known that I, ERNEST E. GAMON, a citizen of the United States, and a resident of the city of Newark, county of Essex, and State of New Jersey, have invented certain new and useful Improvements in Water-Meters, being a part of the original application filed March 3, 1909, Serial No. 481,083, for water-meters; and I do hereby declare the following to be a full, clear, and exact description of the invention, such as will enable others skilled in the art to which it pertains to make and use the same.

My invention relates to improved means embodied in a water meter, whereby the measuring mechanism is rendered automatically adjustable as the temperature of the water varies, so that the water passing through the meter will be measured and registered upon the usual dial, as if the water were at its maximum density.

In practice, when a meter is desired for hot water, the average temperature of the water to be measured is obtained, and a measuring chamber, proportionately increased in volume, is supplied in a regular style meter. This plan works fairly well so long as the temperature of the water remains constant, but when, as in actual use, this varies through a wide range of temperature above and below the average, such a meter cannot be relied upon when accuracy is desired. When extreme accuracy is desired, the value of my improved hot water meter wherein the registration will at all times be in terms of water at its maximum density, is apparent.

Figure 1:
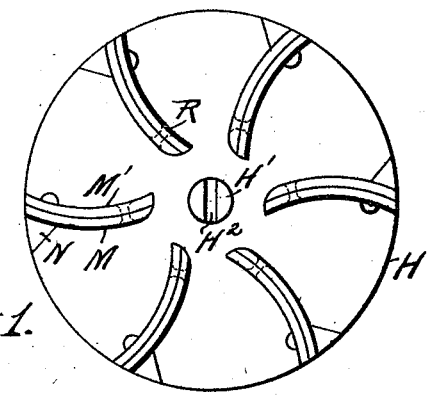
Figure 2:
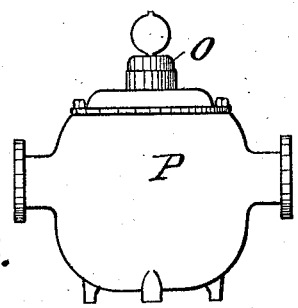

In the accompanying drawings forming a part of this specification, Figure 1 represents a plan view of a turbine embodying my invention. Fig. 2 represents a water meter.

Similar letters of reference refer to like parts throughout the specification and drawings.

In the turbine or inferential type of water meter, there is no measuring chamber, but the registration depends upon the flow of water through the blades. By varying the curvature or angle of the blades, the rate of registration or the speed of the turbine will be varied. To accomplish this automatically, I employ a disk H, having a pivot shaft H', on the upper end of which is a notch $H^2$ for connecting up to the register train in the usual manner. Fig. 1 illustrates a turbine thus designed. The blades are made of compound bars composed of two metals having different coefficients of expansion, and are fixed at one end to the studs N secured to the disk H near its outer edge. As the two metal bars M, M' are closely connected throughout their length by rivets R or other suitable means, it will be seen that variations in the temperature of the water passing through the turbine will cause the curvature of the blades to vary, thus varying the speed of the turbine and hence varying the registration, so that when properly calibrated, the readings will be, at all temperatures, in terms of water as its maximum density.

Any type of registering device adapted for use on various types of meters may be used. In Fig. 2, is shown a conventional type of turbine meter, having the registering dial in the box or case O, the case P inclosing one of my hot water turbines.

Various adaptations of thermometric means for controlling or justifying the registration of a hot water meter according to the temperature of the water passing therethrough may be devised, therefore, I wish it understood that I do not limit my claims to the devices here shown.

I claim:

1. In a hot water meter, the combination of a turbine and means therefor controlled by the temperature of the water for varying the speed of said turbine, comprising compound blades of materials having different coefficients of expansion fixed at one end to the turbine disk near its outer edge.

2. In a hot water meter, the combination of a turbine, compound blades therefor, the component parts of said blades being differently affected by varying temperatures of the water, whereby the speed of said turbine is varied.

3. In a hot water meter, the combination of a turbine, compound blades therefor, each of said blades being secured at one end only, the other ends being movable to vary the angle of said blades with respect to the radius of the turbine.

4. In a hot water meter, the combination of a turbine, compound blades therefor made up of materials having different coefficients of expansion, means for securing one end of each of said blades, the other ends being free to move when variations in the temperature of the water cause unequal expansion of the component parts of said blades, whereby the speed of the turbine is varied.

This specification signed and witnessed this 11th day of August, 1909.

ERNEST E. GAMON.

Witnesses:
FREDK. C. FISCHER,
C. A. ALLISTON.

Copies of this patent may be obtained for five cents each, by addressing the "Commissioner of Patents, Washington, D. C."